C. B. RODGERS.
LIQUID DYNAMIC BALANCING MACHINE.
APPLICATION FILED MAY 8, 1917.

1,243,345.

Patented Oct. 16, 1917.

Inventor
C. B. Rodgers

Witness

By C. A. Snow & Co.
Attorney

C. B. RODGERS.
LIQUID DYNAMIC BALANCING MACHINE.
APPLICATION FILED MAY 8, 1917.
1,243,345.
Patented Oct. 16, 1917.
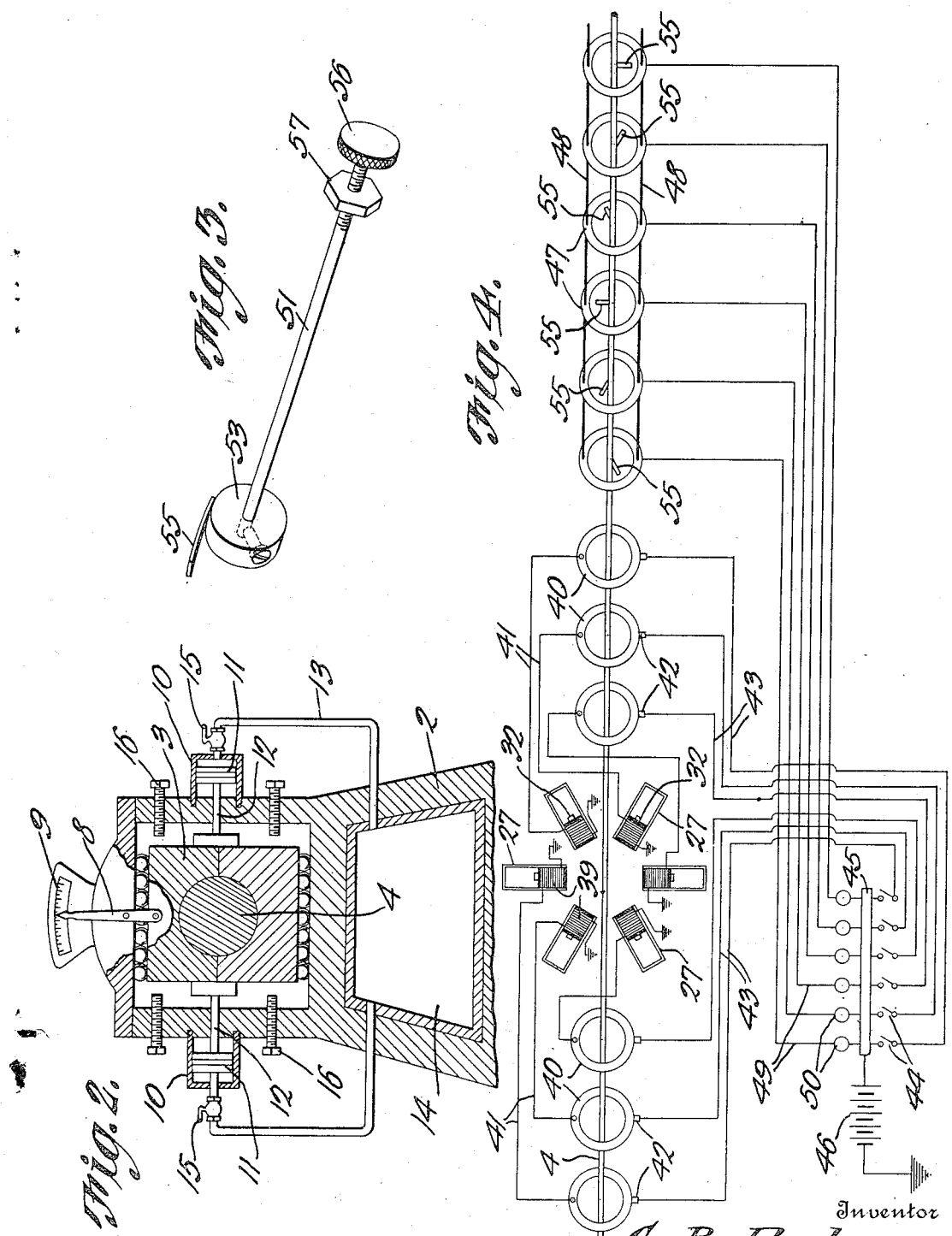

UNITED STATES PATENT OFFICE.

CHARLES B. RODGERS, OF BORDENTOWN, NEW JERSEY.

LIQUID DYNAMIC BALANCING-MACHINE.

1,243,345.   Specification of Letters Patent.   Patented Oct. 16, 1917.

Application filed May 8, 1917.   Serial No. 167,257.

*To all whom it may concern:*

Be it known that I, CHARLES B. RODGERS, a citizen of the United States, residing at Bordentown, in the county of Burlington and State of New Jersey, have invented a new and useful Liquid Dynamic Balancing-Machine, of which the following is a specification.

The present invention relates to a machine for determining the static and dynamic balance of rotating bodies, such as armatures, crank shafts, fly wheels, and the like, and aims to provide a novel and improved appliance of that character for making tests of rotatable bodies, and operable for indicating the plane of the body which is unbalanced, and for balancing the body during the rotation thereof through the medium of a liquid or other mobile substance, in order that the amount that the body is unbalanced in one or more directions, can be accurately determined.

A further object of the invention is the provision in connection with means for indicating the unbalanced plane of the rotating body, novel means rotatable with the body for feeding a liquid or other mobile substance in the direction of the lighter point or points of the body, whereby to balance the same during its rotation, and enable the amount of unbalance thereof to be determined.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawings, wherein:—

Fig. 2 is a sectional detail on the line 2—2 of Fig. 1.

Fig. 3 is a perspective view of one of the contacts of the zone indicator.

Fig. 4 is a diagrammatical view illustrating the electrical equipment of the machine.

Figure 1:
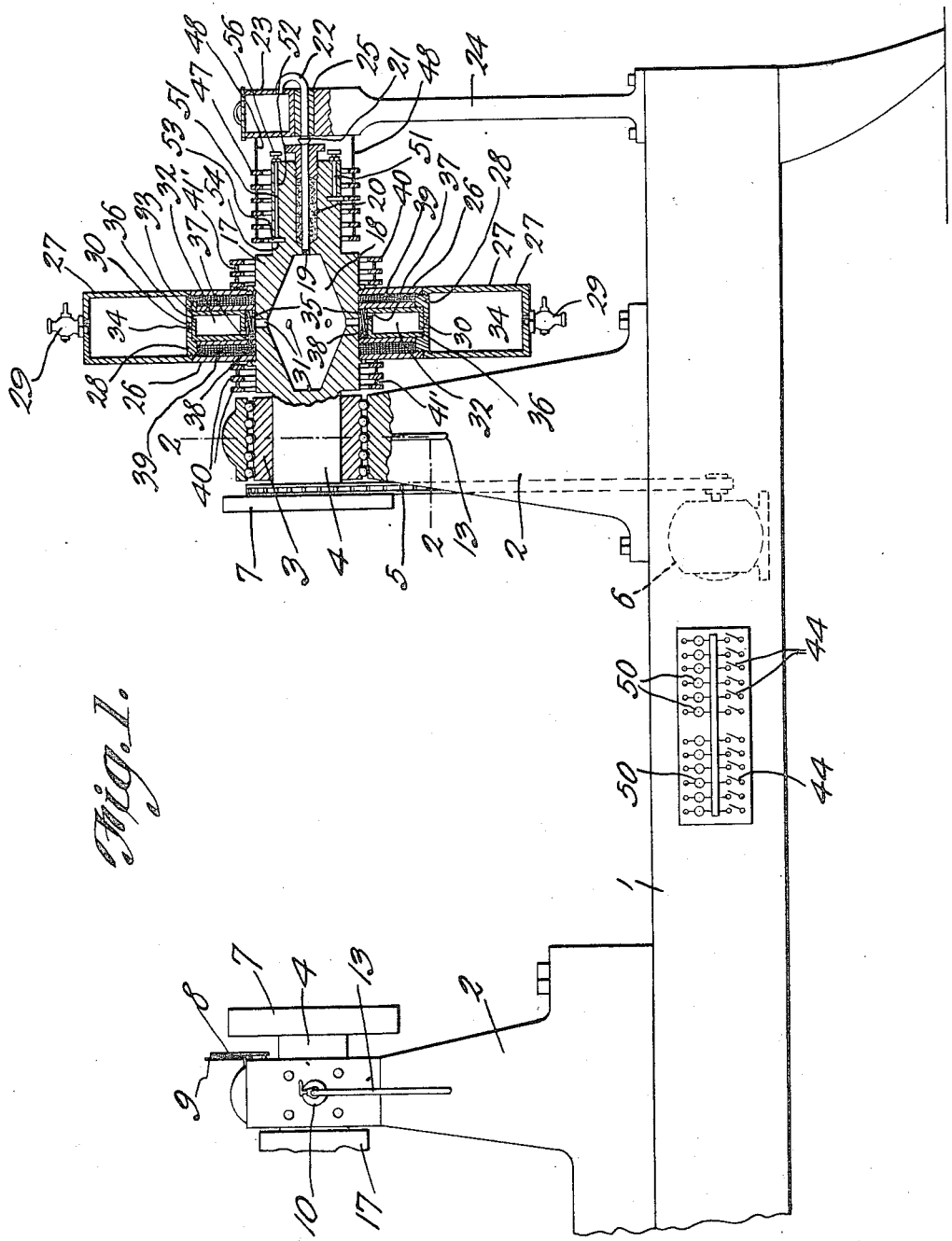
Figure 1 is a side elevation of the machine, partly in section and partly in elevation, portions being broken away.

The machine embodies a frame or bed 1 carrying a pair of standards or pedestals 2, one of which is movable toward and away from the other, to accommodate rotatable bodies of different lengths therebetween. Each of the pedestals 2 carries a rotatable device, and since the devices are duplicates of one another, only one of them will be described in detail, the description of one sufficing for both. A journaled bearing 3 is carried by the pedestal for transverse movement in the plane of test, friction being reduced by means of anti-frictional balls or the like, whereby the bearing can move freely. A shaft or spindle 4 is journaled within the bearing for rotation about an axis alining with the axis of the other spindle, one of the spindles being driven in any suitable manner, such as by means of a sprocket chain 5 connecting it with an electric motor 6 or other prime mover. The adjacent ends of the two spindles are provided with heads 7, to which the object of test is bolted or clamped in any suitable manner, whereby the object of test rotates as a unit with the two spindles, the object being fastened to the spindles coaxial therewith.

A pointer 8 is carried by each pedestal 2 and is suitably connected to the respective bearing 3, to indicate upon a graduated scale 9, when the bearing and its spindle are in normal or intermediate position, and to also indicate the amount that the bearing and its spindle are displaced toward either side. When the pointer 8 registers with the intermediate or zero graduation, this indicates the fact that the spindle is in normal intermediate position, which when the object of test is being rotated, indicates that the same is well balanced. If the object is unbalanced, however, the heavier side thereof will, due to centrifugal action, draw the spindles 4 out of intermediate position, since the bearings 3 can shift in one plane, and as the heavier side of the object or body comes into said plane, the spindles will be shifted toward one side, which will be indicated by the pointers 8.

In order to hold the bearing in intermediate position and resist the movement thereof to either side, a pair of cylinders 10 is carried by the pedestal 2 at the opposite sides of the bearing 3, and pistons 11 are movable within the cylinders and have their stems 12 projecting inwardly and contacting with the bearing. The outer ends of the cylinders are supplied with compressed air or other pressure fluid, providing pressure fluid cushions, by means of pipes 13 connected to said outer ends of the cylinder and to an air tank 14 supplied with pressure fluid from a pump or other suitable source, the pipes 13 having valves 15. Before making the test, the valves 15 can be opened to equalize the pressure in the two cylinders 10, after which the valves 15 are closed. Adjustable stop screws 16 are carried by the pedestal 2 at opposite sides of the bearing, to limit its movement in one direction or the other. When the parts are released, the bearing 3 will be moved to intermediate position, due to the equalizing of pressure in the cylinders, since when the bearing is moved to either side, the movement of the corresponding piston 11 will compress the pressure fluid in the corresponding cylinder to increase the pressure therein, and thereby resist such movement of the bearing, the pressure in the opposite cylinder being relieved and reduced, so that when the side strain on the spindle is removed, the spindle and bearing will be returned to intermediate position.

The gist of the invention resides in the provision of means carried by the spindle 4 for indicating the zone or plane of the object or body which is unbalanced, and for balancing the body during its rotation. Thus, the spindle 4 has an enlargement 17 provided therein with a chamber 18 for mercury or other liquid or mobile substance, that end of the spindle 4 opposite to the end having the head 7 being provided with a stuffing box 19 through which a liquid supplying tube 20 extends to supply the liquid into the chamber 18. The outer end of the tube 20 is connected by a ball and socket or swivel connection 21 with a flexible tube 22 leading to a mercury or liquid tank or reservoir 23, supported by a standard 24, and the tube 22 is preferably extended through a bearing 25 slidably carried by the standard 24, whereby to shift with the spindle. The ball and socket connection 21 permits the tube 20 to rotate with the spindle without rotating the tube 22, and the flexibility of the tube 22, enables it to conform to the shifting of the spindle. The liquid will flow by gravity from the tank 23 into the chamber 18 to keep said chamber supplied with the liquid, mercury being preferably used, although any other suitable mobile substance can be substituted therefor.

Attached by means of screw threads or otherwise to the periphery of the enlargement 17 are a plurality of radial cylindrical casings 26, six of them being illustrated, although any suitable number can be used. Load chambers or pockets 27 are connected to the outer ends of the casings 26, said parts being connected by partitions 28 onto which they are threaded, in the device as illustrated. The chambers or pockets 27 are provided at their outer ends with pet cocks or outlet valves 29 for draining the mercury or liquid from said chambers after the test has been made. The partitions 28 have ports 30, while the enlargement 17 has ports 31 leading from the chamber 18 to the inner ends of the casings 26, and means are provided for transferring charges of predetermined weight of the liquid from the chamber 18 to the chambers or pockets 27. Thus, hollow plungers 32 each adapted to hold a predetermined quantity of liquid, are slidable within the casings 26 radially of the spindle 4, and are provided at their outer and inner ends with the respective valves 34 and 35 to close the respective ports 30 and 31 alternately. The outer end of each plunger 32 has a port 36, and the inner end thereof has a port 37. The plungers are normally moved outwardly by means of springs 38 confined between the inner ends thereof and the enlargement 17, thereby seating the valves 34 and closing the ports 30, while the valves 35 are unseated and the ports 31 open, so that the mercury or other liquid can flow through the ports 31 and the ports 37 by centrifugal force into the plungers 32. The partitions 28 have recesses 33 normally receiving the outer ends of the plungers 32. As a means for retracting the plungers inwardly, solenoids or electro-magnets 39 are fitted within the casings 26 around the plungers, and said plungers are of iron or other magnetic material, whereby to act as cores for the solenoids, whereby when the solenoids are energized, the plungers 32 will be drawn inwardly. When a plunger 32 is moved inwardly, this will seat the valve 35 and close the port 31, while the valve 34 is unseated to open the ports 30 and 36 allowing the charge of liquid within the plunger to be thrown by centrifugal force through said ports into the corresponding pocket 27. Then when the solenoid is deënergized, the plunger 32 will be released, and the valve 34 will then be seated and the valve 35 unseated so that the plunger will again be filled with the liquid from the chamber 18.

The electrical circuits of the solenoids 39 include insulated collector rings 40 connected by conductors 41 with the respective solenoids 39, and carried by insulating pins 41' secured to the enlargement 17, said rings surrounding said enlargement. The other terminals of the solenoids are grounded, and brushes 42 which contact with the collector rings 40 are connected by conductors 43 with switches 44 that are normally open, and which when closed, connect the conductors 43 with a bus bar 45 connected to one pole of a battery 46 or other suitable source of electrical energy, the other pole of which is grounded to complete the circuit of one or more solenoids 39. By closing any one switch 44, this will close the circuit of the respective solenoid 39, whereby the operator can, by operating the switches 44, transfer the predetermined charges of liquid from the chamber 18 to the desired pockets 27.

The zone indicating means embodies a set of contact rings 47, one for each solenoid 39, carried by insulating pins 48 fastened to the standard 34, and said rings preferably surround that terminal of the spindle 4 opposite to the head 7. The rings 47 are connected by conductors 49 with electric lamps 50 or other visual signals, which are in turn connected with the bus bar 45. In order to close the circuits of the lamps 50, contacts are carried by the spindles 4 to engage the rings 47. Thus, stems 51 are fitted in longitudinal bores 52 provided in the spindle 4, and disks 53 are secured to the stems 51 within recesses 54 in the spindle. Contact brushes 55 are secured to the disks 53, and are normally spaced from the inner edges of the rings 47, surrounding the contacts 55. The outer ends of the stems 51 have knobs 56 for turning them to adjust the contacts 55, and lock nuts 57 are threaded upon the stems to bear against the spindle 4 and hold the stems in their adjusted positions.

The electrical connections and arrangement of lamps 50 and switches 44 are such, that when one contact 55 touches the respective ring 47, the lamp 50 being lighted will indicate that switch 44 which should be closed to energize the corresponding solenoid 39 at the opposite side of the axis of the spindle 4. The contacts 35 are spaced around the periphery of the spindle, the same as the solenoids and corresponding parts. The contacts 55 are grounded through the metallic parts, so as to be connected with the grounded pole of the battery 46 to complete the circuits.

The operation of the machine is as follows: After the body or object to be tested is fastened to the heads 7 coaxial with the spindles 4, the body is rotated at a desired speed, a suitable speed governor and indicator (not shown) being used in connection with the motor 6. Now, if the body is unbalanced, the centrifugal force will have a tendency to carry the heavier side of the body radially, in the unbalanced plane of the body, and when this plane of the rotating body coincides with the plane of movement of the spindles 4 and the bearings 3, this will result in the body and spindles being shifted toward one side. The contact 55 of each spindle 4 which is at that moment at the respective side in the plane of test, will contact with the respective ring 47, thus closing the circuit of one lamp 50, which will indicate, with respect to the solenoids 39 and the corresponding parts, the plane or zone of the body which is unbalanced. The corresponding switch 44 is then closed, whereby to retract the plunger 32 at the opposite side, to transfer a charge of the liquid into the corresponding pocket 27. By repeatedly opening and closing the switch 44, a successive number of charges of the liquid can be transferred into the pocket, until a balance is obtained, as indicated by the pointer 8, this process being carried out by each spindle 4 when the two of them are used, although in some cases, the body or object to be tested can be rotated by one spindle only. If the plane of unbalance between the pockets 27 then two of the contacts 55 will touch the respective rings 47, closing the circuits of two lamps 50, whereby the two corresponding switches 44 should be closed to obtain the balance. When a balance is obtained, there is no longer a tendency for the body to become displaced during its rotation, so that the spindles 4 will remain in intermediate position. The lamps 50 will automatically indicate the switches 44 which should be operated, and these switches can be operated as many times as necessary to obtain the balance. After the balance is obtained, the loads of liquid in the pockets 27 can be drained therefrom through the pet cocks 29, and weighed, to determine the amount of unbalance of the body, the location of the pockets 27 with respect to the body indicating where the load should be applied to the body.

Having thus described the invention, what is claimed as new is:—

1. A balancing machine embodying a rotary device for carrying an object to be tested, and means operable during the rotation of said device for selectively transferring a balancing load from its axis radially in different directions.

2. A balancing machine embodying a rotatable device normally in one position and shiftable to one side with an object of test carried thereby, load producing means carried by said device and movable radially from the axis thereof in various directions, and means operable during the rotation of said device for operating said means at one side when said device is shifted toward the opposite side.

3. A balancing machine embodying a rotatable device shiftable to one side with an object of test, load producing means carried by said device and transferable radially in various directions from its axis, and means operable during the rotation of said device for controlling and effecting the transfer of said means selectively in various directions.

4. A balancing machine embodying a rotatable device shiftable to one side, load producing means carried by said device and transferable in charges radially in various directions, and means for selectively transferring the charges in various directions.

5. A balancing machine embodying a rotatable device having a set of pockets around its axis, a mobile substance carried by said device and movable into said pockets, and means selectively controlling the movement of said substance into the respective pockets.

6. A balancing machine embodying a rotatable device shiftable to one side and having an annular set of pockets, a mobile substance carried by said device and movable into said pockets, means for controlling the movement of the substance into each pocket, and means operable during the rotation of said device for selectively operating said controlling means of the several pockets.

7. A balancing machine embodying a rotatable device shiftable to one side and having an annular set of pockets and a central chamber for a mobile substance, and means controllable for transferring charges of the mobile substance into the respective pockets.

8. A balancing machine embodying a rotatable device shiftable to one side and having an annular set of pockets and a central chamber for a mobile substance, means for supplying charges of said substance from said chamber to the pockets, and means operable during the rotation of said device for selectively operating said means.

9. A balancing machine embodying a rotatable device shiftable to one side and having an annular set of pockets and a central liquid chamber, plungers controlling the flow of liquid from said chamber to the pockets and for transferring charges of the liquid to said pockets, and means for selectively operating said plungers.

10. A balancing machine embodying a rotatable device shiftable to one side and having an annular set of pockets, a central liquid chamber, ports communicating with said pockets and ports communcating with said chamber, plungers movable between the first and second mentioned ports for alternately closing them, the plungers being hollow for transferring charges of the liquid from the second mentioned to the first mentioned ports, and means operable during the rotation of said device for selectively operating said plungers.

11. A balancing machine embodying a rotatable device, a load producing means carried thereby and movable radially thereof, and electrical means operable during the rotation of said device for bringing the load producing means into operation in various directions selectively.

12. A balancing machine embodying a rotatable device shiftable to one side, load producing means carried by said device and movable radially in various directions in predetermined charges, and electrical means operable during the rotation of said device for transferring the charges selectively in various directions.

13. A balancing machine embodying a rotatable device shiftable to one side and having an annular set of pockets and a central chamber for a mobile substance, plungers for transferring charges of said substance from said chamber to the pockets, and electrical means for selectively operating said plungers during the rotation of said device.

14. A balancing machine embodying a rotatable device shiftable to one side and having an annular set of pockets and a central liquid chamber, plungers movable between said chamber and pockets for transferring charges of the liquid to the pockets, solenoids surrounding said plungers for operating them as cores, and means for selectively energizing said solenoids.

In testimony that I claim the foregoing as my own, I have hereto affixed my signature in the presence of two witnesses.

CHARLES B. RODGERS.

Witnesses:
PHILIP DICKEY,
THOMAS F. MINCH.